Patented Aug. 24, 1926.

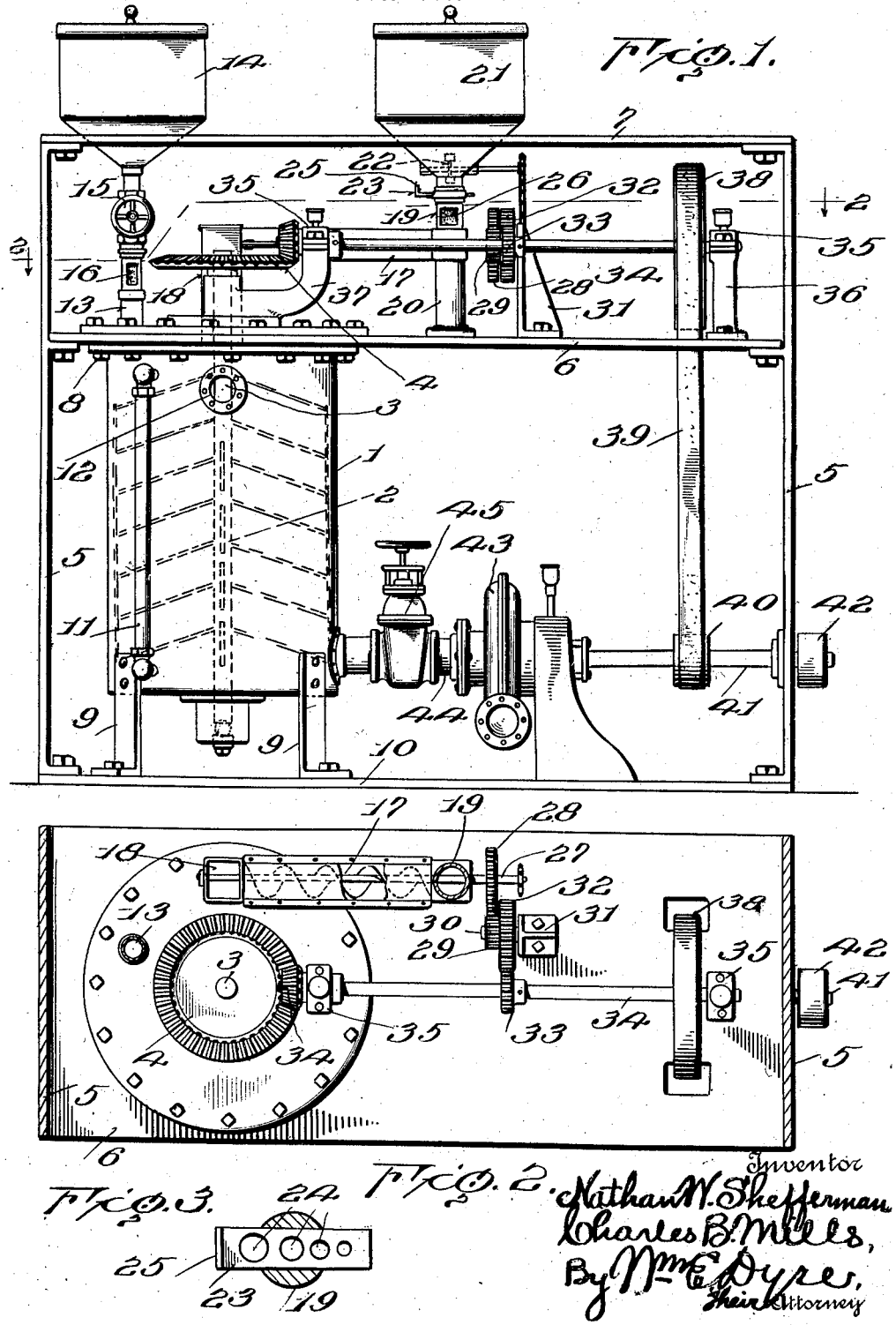

1,597,628

UNITED STATES PATENT OFFICE.

NATHAN W. SHEFFERMAN, OF WASHINGTON, DISTRICT OF COLUMBIA, AND CHARLES B. MILLS, OF BALTIMORE, MARYLAND, ASSIGNORS TO THE JEFFERSON CONSTRUCTION AND OIL TREATING COMPANY, OF WASHINGTON, DISTRICT OF COLUMBIA, A CORPORATION OF THE DISTRICT OF COLUMBIA.

APPARATUS FOR TREATING OIL.

Application filed February 15, 1922. Serial No. 536,684.

Our invention relates to apparatus for treating oils, and more particularly oils of a crude and emulsified character.

The principal object of our invention is to provide means for treating oil with purifying agents, one of said agents consisting of a solid and the other of said agents being a liquid. Our improved means of treating the oil includes a container into which is introduced a solid material and a liquid, and an agitating means for thoroughly mixing the oil, solid and liquid.

Generally stated, our invention involves mechanism for mixing crude oil with a solid substance of the consistency of cement, sand or calcium carbide, and adding thereto a liquid of the consistency of Epsom salts, or starch dissolved in water, or plain water. The particular mechanism embodied in our invention comprises an agitating tank or container having an oil inlet, a conveyer for positively introducing the solid materials for treating the oil in predetermined quantities; a valve controlled means for introducing a liquid into said tank for treating the oil; an agitating mechanism in said tank for thoroughly mixing the several substances, and means for effecting the discharge of the treated oil, said means including a centrifugal pump.

Our invention further consists in the production of simple and easily constructed mechanism as will more fully hereinafter appear.

The accompanying drawings illustrate an embodiment of our invention as constructed for carrying out a process of treating oils in which drawings;

Figure 1 is a view in side elevation of our improved apparatus;

Figure 2 is a horizontal sectional view on the line 2—2 of Figure 1, partly in top plan, and with a portion of the conveyer casing broken away; and Figure 3 is a detail sectional view through the valve or slide for controlling the quantity of solid material introduced.

Referring to the drawings, in which similar reference characters designate corresponding parts in the several views, the apparatus includes among other things a tank or container 1 having revolubly mounted therein an agitator 2. A shaft 3 supports the agitator, said shaft having a ball-bearing at its lower end, the upper end of said shaft projecting above the container and being provided with a bevel gear 4 through which gear motion is transmitted to the agitator in a manner to be hereinafter described.

The tank 1 is mounted in a supporting frame formed of uprights 5 to which are secured the transversely extending shelves or bars 6 and 7. The upper end of the container 1 is attached by means of bolts 8 to the cross bar 6. Angle bars 9 connect the lower end of the container or tank with the base 10, to which latter the uprights 5 may be secured. A gauge 11 is provided on the container and the oil inlet or opening is indicated by the numeral 12.

The means for introducing the liquid to the container 1 is supported above the said container and includes a vertically disposed pipe or conduit 13 communicating with the top of the tank. The upper end of said pipe communicates with the lower conical or inclined walls of the hopper 14 from which the liquid is fed. A valve 15 is provided in said pipe and controls the amount of flow of said liquid. A visual opening over which glass or other transparent material 16 is positioned, permits the flow of the liquid to be viewed.

The means for introducing the solid material to the container is mounted above said container and includes a screw conveyer 17 having the discharge end thereof communicating with a pipe 18 projecting upwardly from the top of the container. The opposite end of the conveyer communicates with the lower end of a vertically arranged pipe or conduit 19 through which the solid material falls into the conveyer trough surrounding the screw. A vertical support 20 extending from the cross bar 6 may be provided for the receiving end of the conveyer and the pipe 19.

Communicating with the upper end of the pipe 19 is the conical or inclined lower discharge end of the hopper 21 from which the solid substance or material is fed. In the lower discharge end of said hopper we provide an agitator 22 for preventing clogging of the material. This construction permits an even flow of the material from said hopper. A valve 23 is provided in the pipe 19, said valve being in the nature of a slide having a series of various size openings 24 for regulating the quantity of material discharged from the hopper and introduced into the container. An operating lip or handle 25 may be provided on said slide for manipulating the same as will be understood.

Means including a visual opening over which glass or other transparent material 26 is positioned, affords a convenient way of observing the passage or flow of the solid material.

The operating means for conveyer 17 includes a shaft 27 having secured thereto a gear 28. A pinion 29 mounted on an intermediate or idler shaft 30 meshes with said gear 28. The idler shaft 30 is mounted in a bearing 31 and has secured thereto a gear 32 with which latter is meshed a smaller gear or pinion 33 secured to a shaft 34. The shaft 34 is supported in bearings 35 provided at the upper ends with brackets or standards 36 and 37. A bevel pinion is secured to one end of the shaft 34 and is designed to mesh with the larger bevel gear 4 hereinbefore referred to, thereby transmitting rotary motion to the agitating shaft 3 and in turn to the agitator. A pulley 38 is secured to the shaft 34 and is adapted to receive the belt 39 extending upwardly from a relatively small pulley 40 secured to the power shaft 41.

The power shaft 41 is journaled in suitable bearings and has secured to its outer end a pulley 42 over which a belt may pass for transmitting power to the apparatus from any suitable source, not shown.

Operably connected with the power shaft 41 is a centrifuge or centrifugal pump 43 interconnected with the discharge pipe 44 of the tank or container and designed to effect the discharge of the treated oil and provide for its transmission through suitable pipe lines to settling vats and the like. A valve 45 is provided in the discharge pipe between the centrifuge and container for regulating the flow of the treated oil from the container.

Apparatus constructed in accordance with our invention will permit of the effective introduction of both liquid and solid materials for mixing with the oil in an agitating tank, the introduction of said treating agents being positively controlled and the amount thereof predetermined and regulated for obtaining the best results. The solid material passes from the hopper 21 and is positively fed by the conveyer 17 to the tank or container in regulated quantities.

The liquid is introduced from the hopper 14 through the valve 15 which serves to regulate the exact quantity desired. Oil is fed to the container through the inlet opening 12. All the materials are thoroughly mixed by the agitator and subsequently withdrawn through the outlet pipe 44 and discharged through the centrifuge 43.

By our present construction it is possible to obtain the exact and desired treatment of crude oil by the use of purifying agents of fluid and solid constituencies respectively. We do not wish to be understood as limiting our invention to the details of construction set forth, but define our invention as follows:

We claim:

1. An apparatus for treating liquid oil at atmospheric temperature including a container containing the oil to be treated, a supporting frame-work for said container, a hopper containing an oil purifying liquid substance arranged on said frame-work and provided with means for feeding regulated quantities of the purifying liquid to the container, a second hopper containing a solid oil purifying substance, means including a conveyer for feeding said solid substance from the last mentioned hopper to said container, an agitator arranged in said container, and means including a common driving shaft for actuating said conveyer and agitator.

2. An apparatus for treating liquid oil at atmospheric temperature including a container containing the oil to be treated, a supporting frame-work for said container, means carried by said frame-work above the container for introducing an oil purifying liquid to said container, said last mentioned means including a hopper containing an oil purifying liquid, conveyer means supported by said frame-work and communicating with said container, a hopper containing a solid oil purifying agent and connected to said conveyer means, an agitator arranged in the container, and means including a common driving shaft for actuating said agitator and conveyer means.

3. An apparatus for treating emulsified oils including in combination a container having an oil inlet, means for introducing liquid to said container for treating the oil, a conveyer for introducing solid material to said container for treating the oil, means for operating said conveyer, an agitator in said container, means interconnected with said conveyer operating means for operating said agitator, means including a centrifuge for discharging the treated oil, and means interconnected with the aforesaid agitator operating means for operating said centrifuge.

In testimony whereof we affix our signatures.

NATHAN W. SHEFFERMAN.
CHARLES B. MILLS.